E. C. ABRAHAM.
ATTACHMENT FOR MOTOR CYCLES.
APPLICATION FILED FEB. 20, 1909.

944,932.

Patented Dec. 28, 1909.

Witnesses
Frank B. Hoffman
W. S. McDowell

Inventor
Edward C. Abraham
By Victor J. Evans
Attorney

UNITED STATES PATENT OFFICE.

EDWARD C. ABRAHAM, OF SANTA CRUZ, CALIFORNIA.

ATTACHMENT FOR MOTOR-CYCLES.

944,932.   Specification of Letters Patent.   Patented Dec. 28, 1909.

Application filed February 20, 1909. Serial No. 479,029.

*To all whom it may concern:*

Be it known that I, EDWARD C. ABRAHAM, a citizen of the United States, residing at Santa Cruz, in the county of Santa Cruz and State of California, have invented new and useful Improvements in Attachments for Motor-Cycles, of which the following is a specification.

This invention relates to improvements in handlebars, particularly those used on self propelled vehicles.

The main object of the invention is the provision of a handlebar having an arcuate steering element and which is substantially concentric with the steering post, the said arcuate element or member being so arranged in front of the operator as to be substantially equidistant from him at all times irrespective of the arc through which it is moved.

Another object of the invention is the provision of a handlebar which consists of a pivoted arcuate yoke and a pair of ordinary handlebars for supporting the said yoke.

With these and other objects in view, the invention consists substantially in the construction, combination and arrangement of parts hereinafter described and set forth in the appended claims.

Figure 1:
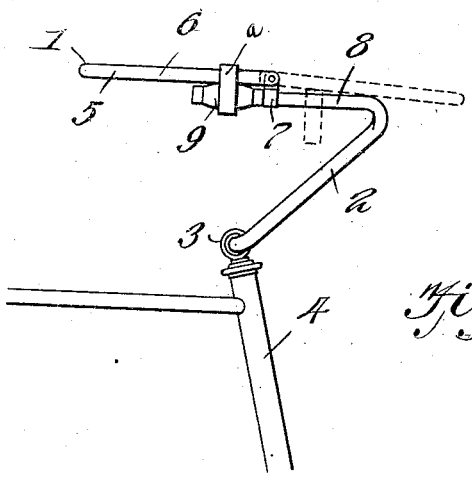
Figure 2:
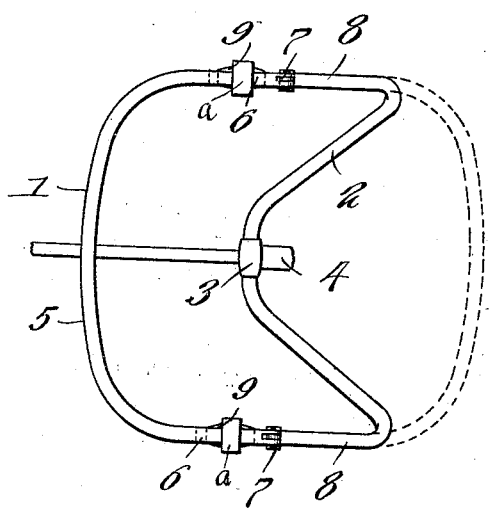

Referring to the drawings: Figure 1 is an elevation of the steering mechanism showing the maneuver in which the arcuate member is secured to the ordinary handlebar. Fig. 2 is a top plan of the steering mechanism, and Fig. 3 is a top plan of a modified form of steering mechanism.

Referring more particularly to the drawing, the reference character 1 designates a steering element or yoke pivoted upon a pair of ordinary handlebars 2 for arcuate and lateral movement. The handlebars 2 are in turn fixed to the steering post 3 mounted in the frame 4.

The arcuate steering element or yoke is substantially concentric with the steering post and normally extends transversely of the frame and is arranged in front of the operator so as to be approximately equidistant from him at all times irrespective of the movement of the said yoke. The yoke is composed of an arcuate bar or hand grip 5 which terminates in relatively disposed arms 6, the said arms pivoted in brackets 7 fixed upon the rearwardly extending arms 8 of the handlebars 2. The arms or extensions 6 normally rest upon the hand grips 9 of the handlebars 2, and the said grips affording a substantial supporting means for the yoke element. The steering yoke may be readily swung back on its pivotal connection to the inoperative position, shown by dotted lines in Figs. 1 and 2, by lifting the yoke out of the normal horizontal plane and giving the same an arcuate movement toward the front of the machine. When the yoke is in an inoperative position, the approximately horizontal and backwardly extending arms 8, of the handlebars 2 serve as a support or rest for holding the yoke within easy grasp of the operator.

Figure 3:
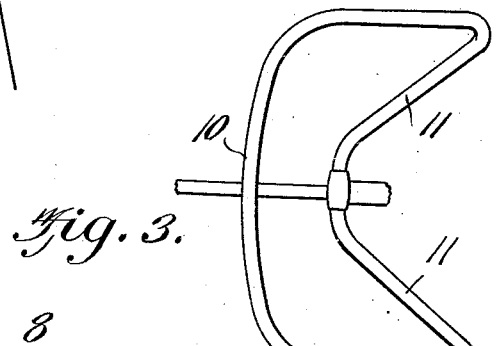

A modified form of a steering element will be seen in Fig. 3 illustrating the manner in which it can be made in one continuous piece. This form of steering element consists of an approximately U-shaped yoke 10 which is substantially equidistant from the operator at all times irrespective of the arc of movement and formed integral with the handlebars 11 of the aforesaid character.

It is to be understood, with reference to the preferred form of my invention, that if found desirable, locking rings *a* may be employed to lock the arms 6 of the yoke 1 to the hand grips 9 of the handlebars 2 and thus eliminate the possibility of the yoke 1 swinging upon its pivotal connection during the use of the same by the operator. The rings *a* can be readily shifted from their locking position to the dotted line position, shown in Fig. 1, so as to allow the yoke 1 to be swung forward.

Having thus illustrated and described one practical embodiment of my invention, I do not wish to be understood as confining myself to the particular construction and arrangement of the several parts as shown, but that minor details and changes of construction may be resorted to within the scope of the claims.

What is claimed as new is:—

1. In combination with a steering post, a steering element comprising a substantially U-shaped yoke, a pair of supporting handlebars, and brackets fixed upon the said handlebars, the said yoke having pivotal connection in the brackets for arcuate movement to and from the operator.

2. In combination with a steering post, a steering element comprising a substantially U-shaped yoke, a pair of supporting handlebars, means for locking the yoke to the handlebars, and brackets fixed upon the said handlebars, the said yoke having pivotal connection in the brackets for arcuate movement to and from the operator.

In testimony whereof I affix my signature in presence of two witnesses.

EDWARD C. ABRAHAM.

Witnesses:
K. L. HENCHY,
W. S. WARD.